Nov. 4, 1969    R. G. SMITH    3,476,349
ADJUSTABLE SUPPORT
Filed March 29, 1967

WITNESSES
Helen M. Darkas
James F. Young

INVENTOR
Richard G. Smith
BY John L. Wiegreffe
ATTORNEY

United States Patent Office 3,476,349
Patented Nov. 4, 1969

3,476,349
ADJUSTABLE SUPPORT
Richard G. Smith, Baltimore, Md., assignor to Westinghouse Electric Corporation, Pittsburgh, Pa., a corporation of Pennsylvania
Filed Mar. 29, 1967, Ser. No. 626,868
Int. Cl. A47g 1/24
U.S. Cl. 248—476                                    1 Claim

ABSTRACT OF THE DISCLOSURE

An adjustable support is described in which one end of a supported member is supported relative to a supporting member by a three-point suspension system in which one point is resiliently biased to urge the supported member against the other two points which are adjustable but rigid. The adjustable rigid points are movable radially along the axes on which they are located so that a combination of their relative movements can angularly adjust the axis of the supported member within a blur circle. The axis of the supported member may be adjusted by adjusting the suspension system at each end angularly as well as in non-angular translatory movement.

---

This invention relates to a support having a precise angular adjustment. The device is particularly adapted for mounting optical devices, or the like, which require very precise, although small adjustments. However, it will be apparent from the description that the invention is not limited to use in optical environment.

Referring to a typical environment of the present invention, in optical devices as well as in laser and infrared systems, there is a frequent requirement for an adjustable support mechanism which is capable of making very minute and precise adjustments of devices, such as mirrors, lenses, or other components.

These devices must not only be very precise but they must be repeatable, that is, they must be so constructed that once an adjustment is found it can be accurately determined and can thereafter be changed and yet can be returned to the original position with extreme accuracy. Such devices must be capable of making adjustments in the milliradian range, must be very simple, compact in construction, and must be able to withstand a shock of at least 10 G's. Also these devices must be free of backlash in adjustment and there must be a minimum of cross-talk between the adjusting mechanism.

The primary object of the present invention is to provide a novel and improved adjustable support which is simple, compact, inexpensive to build and of lightweight construction.

Another object is to provide a novel and improved adjustable support in which resilient means acts against positive adjusting means to provide a positive angular adjustment and which is capable of withstanding impact shocks.

Figure 1:
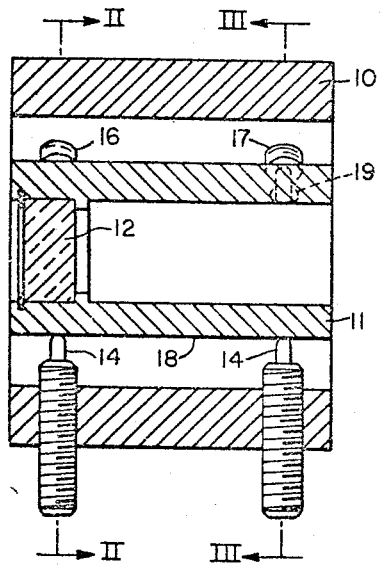
Figure 2:
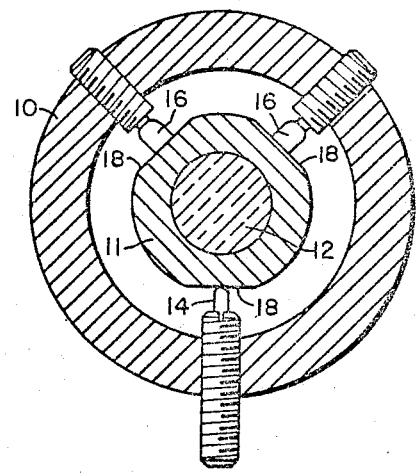
Figure 4:
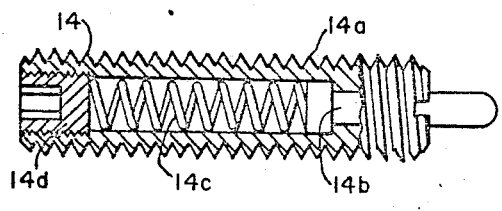
Figure 3:
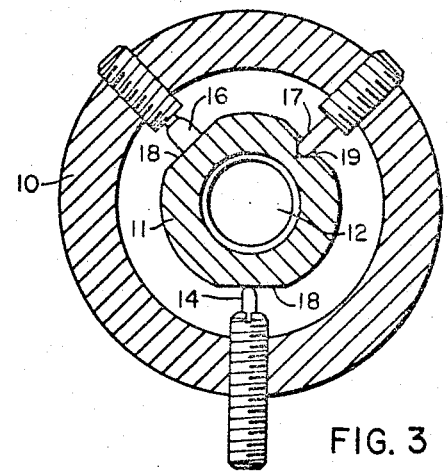
Figure 5:
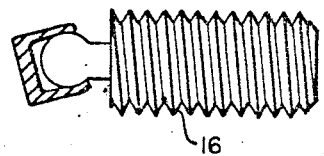

Other and further objects will become apparent from the following description when considered in connection with the accompanying drawings, in which:

FIGURE 1 is a profile sectional view of the invention;
FIG. 2 is a cross-sectional view on line II—II of FIG. 1;
FIG. 3 is a cross-sectional view on line III—III of FIG. 1;
FIG. 4 is an enlarged profile view, partially in section, of the screws having the spring loaded plunger; and
FIG. 5 is an enlarged profile view of the adjusting screw having the swivel pad.

As seen from the drawings, the adjustable support of the present invention has means for supporting each end of a supported member relative to a supporting member by a three-point suspension system in which one point is resiliently biased to urge the supported member against the other two points which are adjustable, but rigid. The rigid adjusting points are angularly spaced apart preferably by 90°, although not limited thereto, and the resilient point is on the bisector of the angle between the rigid points. The adjustable rigid points are movable radially along the axes on which they are located so that a combination of their relative movements can angularly adjust the axis of the supported member within a blur circle. By adjusting each suspension system the axis of the supported member may be adjusted angularly as well as in non-angular translatory movement.

Referring to an embodiment used for illustrating the invention, a base supporting member 10 is in the form of a cylindrical housing although, it will be obvious that it need not be in the exact shape shown. A supported member 11 is positioned inside supporting member 10 by the novel three-point suspension system of the present invention.

The supported member 11 is adapted to serve as an angularly adjustable holder for an object or component, such as a mirror 12. To withstand impact shocks either end of the supported member 11 is preloaded by a force exerted by a spring-loaded plunger unit 14 which threadedly engages and extends radially through the supporting member 10. The spring loaded plungers 14 are adjusted so the force exerted by the spring on the supported member is sufficient to prevent any movement of the supported member when the assembly is subjected to accelerations. These units 14 are identical, and as shown in FIG. 4, comprise an externally threaded sleeve 14a, and have an internal bore for receiving plunger 14b. The main body of the plunger 14b extends through a stepped-down bore so that the head of the plunger is provided with a limiting stop. The plunger is backed by a spring 14c which is preloaded by a threaded plug 14d.

It will be noted from FIGS. 2 and 3 that, in addition to the spring loaded plunger units 14, the left-hand end of the supported member 11, as viewed in FIG. 1, is held by two adjusting screw units 16, each having swivel pad tips, as shown in FIG. 5. The right-hand end of the supported member 11 is held by one adjustable screw unit 16 exactly like those on the left-hand end of the member, and one spherical-nosed non-swiveling adjusting screw 17 in addition to the spring loaded plunger unit 14.

In the preferred embodiment, illustrated in FIGS. 2 and 3, the rigid adjusting units 16 and 17 are shown as being spaced angularly by 90° and radial adjustment along their axes is resiliently opposed by the spring-loaded units 14 located on the bisectors of the angle between the rigid units. The 90° angular disposition minimizes cross talk but other angular dispositions giving substantially the same results are considered to be within the contemplation of the present invention.

The adjusting units 14 and 16 engage flat lands 18 on the supported member 11 while the spherical end of the unit 17 engages a conical countersunk recess 19 in the supported member 11. The flat lands permit relatively lateral displacement between the adjusting units and the supported member 11 while the spherical-nosed unit 17 engages the conical recess 19 to provide a universal pivot for the supported member 11 and prevents axial movement and prevents rotational movement about the center line of the supported member 11 while permitting universal pivotal movement about the spherical end of the adjusting unit 17. It will be seen that the center of curvature of the spherical end of the adjusting unit 17 serves as the apex of a conical adjustment movement of the supported member 11. Since the apex of this conical movement is off the central axis of the supported member 11 the cone of adjustment will be skewed with respect to the central axis of the supported member 11. However, in view of the fact that the spherical nose of the adjusting unit 17 can be moved transversely of the axis of the supporting member 10 the apex of the cone of adjustment can be variously positioned and thus increase the range and versatility of the angular adjustment of the supported member 11. Also, the adjustable unit 17 can be moved in conjunction with the other adjusting units for providing non-angular translatory movement of the supported member 11 relative to the supporting member 10.

In general, it will be desired to have the central axis of the supported unit 11 substantially coinciding with the central axis of the supporting member 10. Accordingly, the two rigid adjusting units 16 on the left-hand end of the device, in combination with the spring-loaded device will be adjusted to a central position. Then the rigid adjustment units 16 and 17 and the spring loaded adjustment unit 14 on the right-hand end of the unit will be adjusted to bring the center line of the supported member 11 in coincidence with the center line of the supporting member 10. Angular adjustment will thereafter be made by turning either or both of the rigid adjusting units 16 on the left-hand end of the device. However, it will be apparent from what has previously been said that where desired the transverse position of the universal pivot point on the adjusting unit 17 can be changed by the conjoint adjustment of the one rigid adjusting unit 16 and the other adjusting unit 14. Also, if desired the conjoint operation of the rigid adjusting unit 16 and the spring-loaded unit 14 can be made such that the right-hand end of the supported member 11 can be rocked about the universal pivot point on the end of the adjusting unit 17 where it might be desired to make further adjustment. It will be noted that in any type of adjustment the spring-loaded adjustment units 14 maintain a firm pressure on the supported member 11 to hold it against the other adjusting points, at the same time provide the necessary resiliency to permit the supported member to be changed in angular position without damaging the adjusting units or the starting supported member 11.

What is claimed is:

1. In an adjustable support, an outer supporting member, an inner supported member, means for adjustably supporting one end of said supported member with respect to said supporting member for movement in a plane transverse to the axis of said supporting member, and means for adjustably supporting the other end of said supported member for universal pivotal movement about a point displaced transversely from the axis of said supported member, said adjustable supporting means including pre-loaded resilient means and adjustable non-resilient means for applying forces on said supported member at two points spaced angularly with respect to each other and with respect to the direction in which said resilient means is yieldable, said non-resilient means for said other end of said supported member including a pin engaging a conical recess in said supported member to provide said universal pivot point.

References Cited
UNITED STATES PATENTS

| | | | |
|---|---|---|---|
| 461,389 | 10/1891 | Paoli | 88—1 |
| 2,624,537 | 1/1953 | Rouy | 248—180 |
| 2,189,766 | 2/1940 | Unertl | 33—50 |
| 2,456,383 | 12/1948 | Collins | 287—12 |
| 3,161,716 | 12/1964 | Burris et al. | 350—10 X |

ROY D. FRAZIER, Primary Examiner

F. DOMOTOR, Assistant Examiner

U.S. Cl. X.R.

33—50; 287—52.08; 350—288